US007699144B2

(12) United States Patent
Hsieh

(10) Patent No.: US 7,699,144 B2
(45) Date of Patent: Apr. 20, 2010

(54) ACTIVE BRAKE RELEASE DEVICE DRIVEN BY A SECOND MOTOR AND ATTACHED TO THE EXTERIOR OF A DOOR CONTROLLER

(76) Inventor: Chung Hsien Hsieh, 116 Fen-Liao Road Sec. 1, Lin-Kou Hsiang, Taipei Hsien (TW)

( * ) Notice: Subject to any disclaimer, the term of this patent is extended or adjusted under 35 U.S.C. 154(b) by 408 days.

(21) Appl. No.: 11/784,745

(22) Filed: Apr. 9, 2007

(65) Prior Publication Data

US 2008/0244977 A1 Oct. 9, 2008

(51) Int. Cl.
*F16D 65/36* (2006.01)

(52) U.S. Cl. .......................................... 188/157; 160/9

(58) Field of Classification Search ..................... 160/1, 160/9, 188, 2, 298; 188/156, 161, 163, 157, 188/164, 74, 78
See application file for complete search history.

(56) References Cited

U.S. PATENT DOCUMENTS 5,245,879 A 9/1993 McKeon
5,580,865 A 12/1996 Alpegiani et al.
5,673,514 A 10/1997 McKeon
5,850,865 A 12/1998 Hsieh
5,893,234 A 4/1999 McKeon
7,299,847 B1 * 11/2007 Evans ............................ 160/1

OTHER PUBLICATIONS

U.S. Appl. No. 11/489,329, filed Jul. 2006, Hsieh et al.
U.S. Appl. No. 11/012,545, filed Dec. 2004, Hsieh.
U.S. Appl. No. 10/998,373, filed Nov. 2004, Hsieh.

* cited by examiner

*Primary Examiner*—Melanie Torres
(74) *Attorney, Agent, or Firm*—Bucknam and Archer

(57) ABSTRACT

An active break release device externally attached to a door controller. The door controller includes a housing for receiving a first motor which rotates a rotary shaft to reel the door; a braking device installed around the periphery of the rotary shaft. The active break release device comprises: at least a brake releasing rod, one end of which is to activate the braking device while the other end of which extends to the outside of the door controller; at least a second motor, for moving the other end of the brake releasing rod; a circuit having a backup power source used to temperately supply electricity to the second motor if electricity fails, so that the one end releases the braking.

20 Claims, 8 Drawing Sheets

ACTIVE BRAKE RELEASE DEVICE DRIVEN BY A SECOND MOTOR AND ATTACHED TO THE EXTERIOR OF A DOOR CONTROLLER

TECHNICAL FIELD

This invention relates to an active brake release device, more particularly to an active brake release device driven by a second motor and attached to the exterior of a door controller, which can actively shut off the safety door in unexpected electricity failure condition.

BACKGROUND OF THE INVENTION

The conventional safety door, such as a fire door and an emergency door, consists of one or the other of these two types of systems based on the type of door controller, that is, the failsafe system and the non-failsafe system. As the safety door is usually used as a door access system for ordinary people, these two door controller systems both have their merits and demerits in usage depend on the user, (1 ) Failsafe system: In the case of electricity failure, no matter what the reason is, the braking device of the door controller should immediately release the braking and shut off the safety door. In the event of fire alarm without electricity failure, the brake device will be released by cutting off the power by such device as smoke detector, or temperature sensor, or the other fire alarm detector, or by cutting off the power with a mechanical means after a fusible links is melted in high temperature due to the fire, so that the safety door will close. If the reason of electricity failure is definitely due to the fire, the device can block the pilot fire or the exhaust smoke at the first instant of fire. So, the system is preferred due to its higher safety of fire protection. However, if the electricity failure is not due to fire, the system will cause some inconvenience, and affect normal entry/exit function. This is the major defect. A number of relevant documents has been proposed, for example, the U.S. Pat. Nos. 5,850,865, 5,245,879, 5,893,234, 5,673,514, U.S. Ser. No. 11/489,329, U.S. Ser. No. 11/012,545 and U.S. Ser. No. 10/998,373 etc. belongs to this failsafe system category. In the case of unexpected electricity failure, the brake will actively be released, so the door will close.

(2) Non-failsafe system: In the case of electricity failure, no matter what the reason is, the braking device will come into braked state and not shut off the safety door immediately. After the fire alarm has been confirmed by the device such as smoke detector, temperature sensor or the other fire detecting devices, temporary current is supplied by a back-up power source, such as capacitor or battery, to the brake device so as to temporarily maintain the releasing of the brake, or a fusible links is melted in high temperature under the fire to activate the brake device so as to release the braking by a mechanical means, so the safety door will close on its own. This type of system provides the advantage of not shutting off the safety door immediately after the electricity failure. If electricity failure is not due to fire, the access of the door by user is not affected.

However, the person skilled in the art should understand that if the reason of electricity failure was indeed due to fire, and if the fire location is at a certain distance away from the fire detecting device or the fusible links, the safety door is unable to be shut off at the first instant of fire, in the case a non-failsafe door controller is used. The insufficiency in safety is the main demerit of this type.

SUMMARY OF INVENTION

The main object of the present invention is to provide an active brake release device driven by a second motor and externally attached to the door controller, for the purpose of enhancing the safety of fire protection for the non-failsafe door controller.

In order to achieve the above and another objects, an active break release device driven by a second motor and externally attached to the door controller (1) of the present invention is provided for the triggering of automatic brake releasing to close the safety door in unexpected electricity failure condition, in which said door controller (1) have a housing for receiving a first motor (2), the driving torque of which is transferred through a rotary shaft to a reel for winding the door;

a braking device is provided at the outside of said rotary shaft, which includes a braking portion normally located at a brake activating position, and located at a brake releasing position when the first motor is energized, characterized in that the active break release device comprises:

at least a brake releasing rod, one end of which activates the braking portion to release brake by leverage action force, while the other end of which extending to the outside of the door controller;

at least a second motor provided externally at the door controller and moved together with the other end of the brake releasing rod, the second motor being temporarily supplied with electricity through a circuit having a backup power source in the case of unexpected electricity failure condition, and the braking portion being driven by the second motor to release the braking.

In this way, the fire protection of the non-failsafe door controller is turned from passive into active manner such that the safety door will close actively at the first instant of unexpected electricity failure.

BRIEF DESCRIPTION OF DRAWINGS

The present invention will be further understood by the detailed description of the following embodiments in conjunction with the accompanied drawings, wherein.

DETAILED DESCRIPTION OF PREFERRED EMBODIMENTS

The technical features of the present invention will be better understood by the further description of preferred embodiments of the present invention, which should not be considered as limitations to the scope of the present invention, in conjunction with the accompanied drawings.

Figure 1:
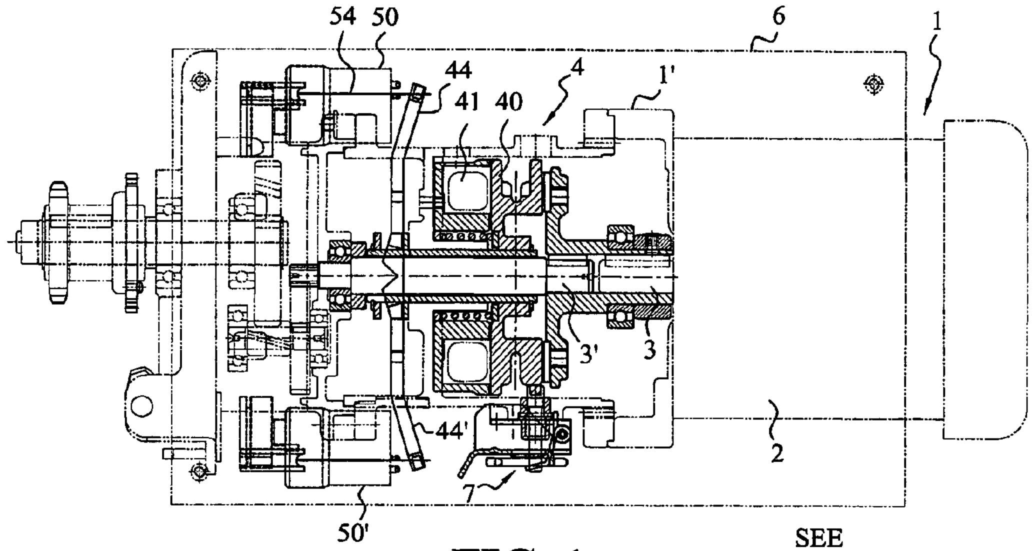
FIG. 1 is a schematic plan view showing the active brake release device attached to the exterior of a door controller according to a first embodiment of the present invention, in which some components are shown in imaginary lines.
Figure 1A:
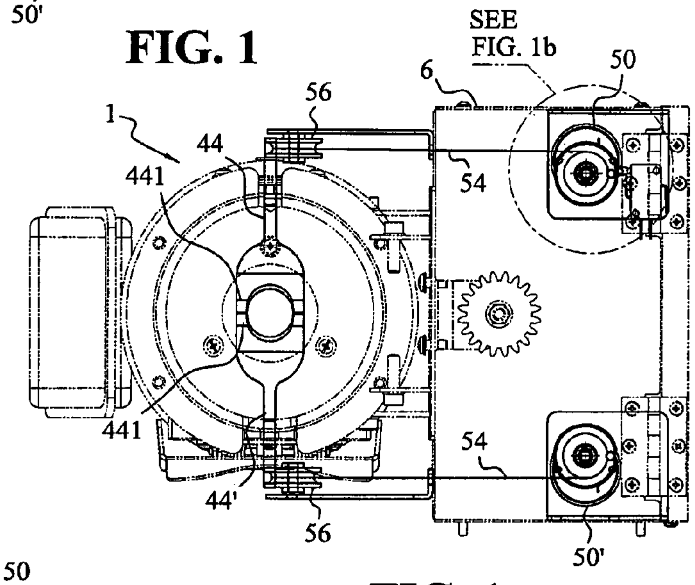
FIG. 1*a* is a view seen from the left side of FIG. 1.
Figure 1B:
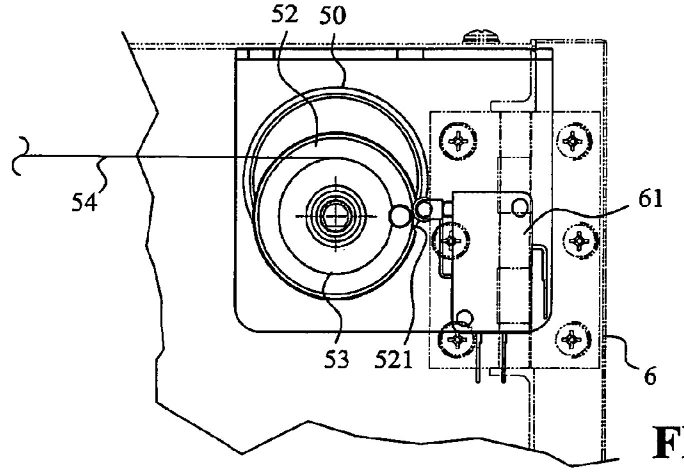
FIG. 1*b* is a partial enlarged schematic view of the encircled portion in FIG. 1.
Figure 1C:
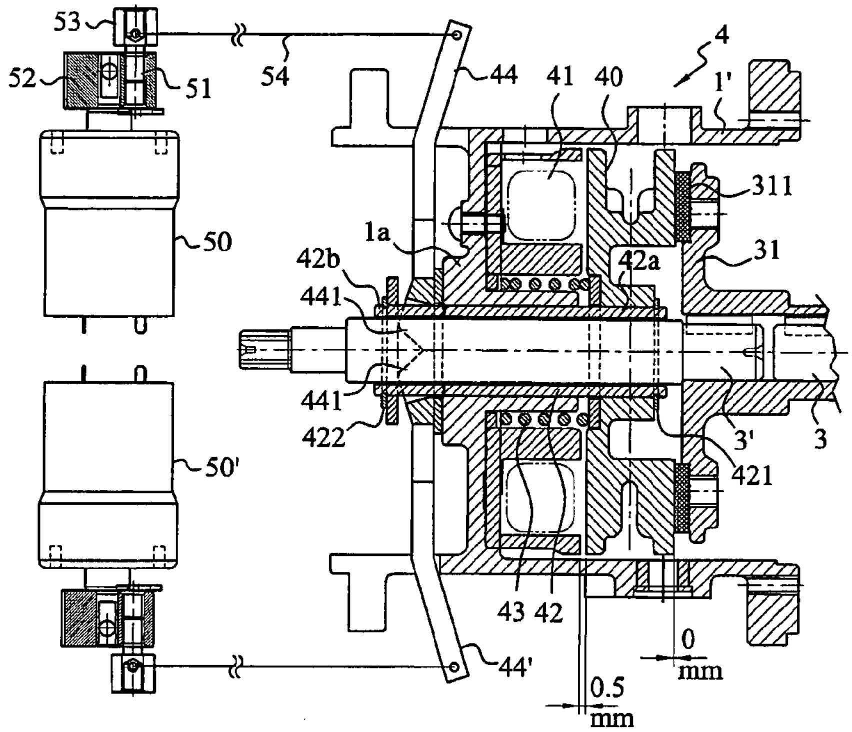
FIG. 1*c* is a schematic sectional view showing the first embodiment of the present invention (in which irrelevant components are omitted thereof) in which the device is in braked state.
Figure 1D:
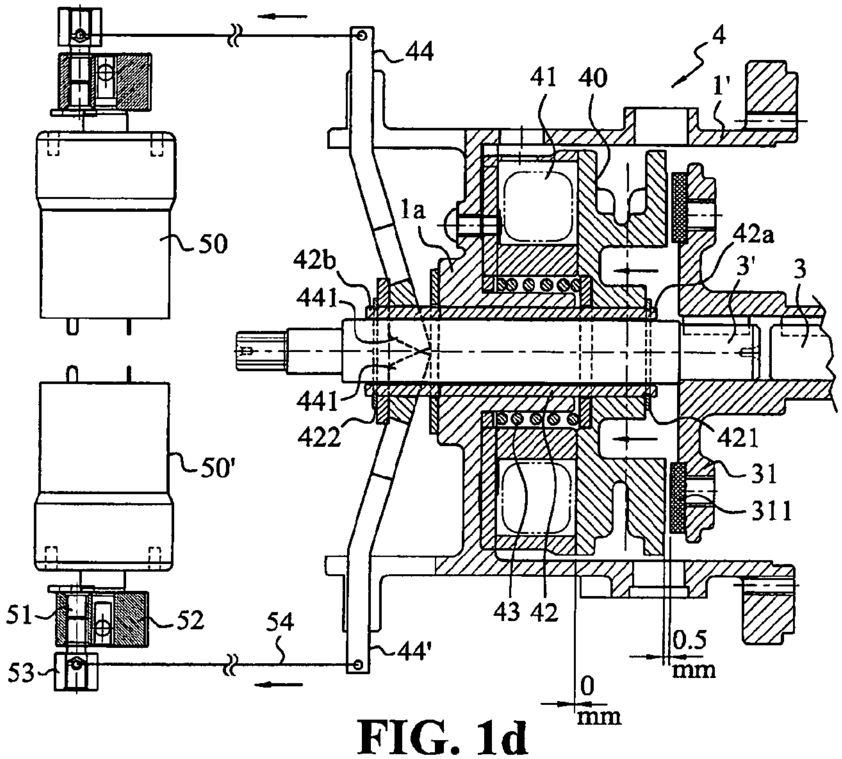
FIG. 1*d* is a schematic sectional view showing the first embodiment of the present invention (in which irrelevant components are omitted thereof) in which the device is in brake-released state.

FIG. 1~FIG. 1*d* show the active brake release device according to the first embodiment of the present invention. Inasmuch as this invention is irrelevant to the change of the other structure part of the door controller, only part of the door controller is shown in those drawings and the irrelevant components are shown in imaginary lines. According to the present invention, the door controller 1 has a housing 1' for receiving a first motor 2, the driving torque of which is transferred through the rotary shaft 3,3' to a reel for winding the door (not shown).

A brake device 4 is provided at the outside of the rotary shafts 3,3', which includes:

a braked disc 31, the center of which is inserted and fixed on the shafts 3,3' to rotate together therewith, which has a radial surface for mounting a brake lining 311;

a bushing 42, having a first end 42*a* and a second end 42*b*, which is loosely fitted at the outside of the rotary shaft 3' for sliding in the axial direction thereof, a retainer 422 is provided at the outside of the second end 42*b* of the bushing 42;

an electromagnet 41, which is fixed on the side wall 1*a* of the housing 1' of the door controller 1 and encircling around the outside of the bushing 42;

a braking portion 40, the center of which is inserted and fixed on the first end 42*a* of the bushing 42 by a retainer 421, and the braking portion 40 is located between the braked disc 31 and the electromagnet 41;

A spring element 43, which is received between the bushing 42 and the electromagnet 41 for producing a bias force for the braking portion 40 to abut against the brake lining 311 of the braked disc 31 so as to become normally braking state.

A pair of brake releasing rods 44, 44', which are formed at the respective inner end, with a convex portion 441 located respectively at opposite side in radial direction at the outside of the second end 42*b* of the bushing 42 and positioned between the side wall 1*a* of the housing 1' and the retainer 422, and the outer end of each of the brake releasing rod is extending to the outside of the housing 1', a pull force applied at the outer end of the rod will cause a leverage action, with the convex portion 441 as the fuilcrum, which will cause the bushing 42 slide in the axial direction to release braking.

A pair of second motors 50, 50', such as DC small motor, which are provided at the outside of the door controller 1, preferably in a power distributing cabinet 6 of the door controller 1. An eccentric wheel 52 is fixed on each shaft 51 of the motors, and a winding portion 53 is provided on each eccentric wheel 52. A pair of cables 54 are provided with one end connected to the winding portion 53, and the other end connected to the outer end of the brake releasing rod 44, 44' through a plurality of deflecting wheels 5, as shown in FIG. 1*a*.

According to the present invention, the braking portion 40 is a manually chain-operated disc which is rotated by pulling a chain (not shown) in the case of unexpected electricity failure. In the normal mode of electrically operated condition, the chain is held by a holding section 7 provided at the outside of the housing 1' so that the manually chain-operated disc is kept inoperable. The braking portion 40 normally keeps the braked disc 31 in braked state in the case that the first motor 2 is not energized. When the first motor 2 is energized, the electromagnet 41 is energized and excited thereby. Thus, the braking portion 40 separates apart from the braked disc 31 and is attracted to the side of the electromagnet 41 such that a brake releasing state is formed.

A circuit is formed in the device of the present invention. The circuit includes a capacitor or a battery for storing backup power which is used to temporarily supply electricity to the second motor 50,50' in the case of electricity failure condition to wind the cable 54. Thus, the bushing 42 slides in the axial direction so as to release the brake by the leverage action of the brake releasing rods 44, 44'(as shown in FIG. 1*d*). Furthermore, the circuit has a sensor switch 61 provided at the side of the eccentric wheel 52 of the second motor 50, 50'. Correspondingly, the eccentric wheel 52 is formed with a positioning groove 521, which is used to control the eccentric wheel 52 to return to its original position in the case of recovery of electricity (as shown in FIG. 1*b*). Those person skill in the art should understand that the pair of the second motors and the pair of brake releasing rods in this embodiment forms two combination of independently operated brake release device, in other word, one second motor and one brake releasing rod forms one independently operated combination, and consequently the other combination formed by the other second motor and the other brake releasing rod serves as a backup device. Therefore, operation safety can be assured even if one combination is out of order.

Figure 2:
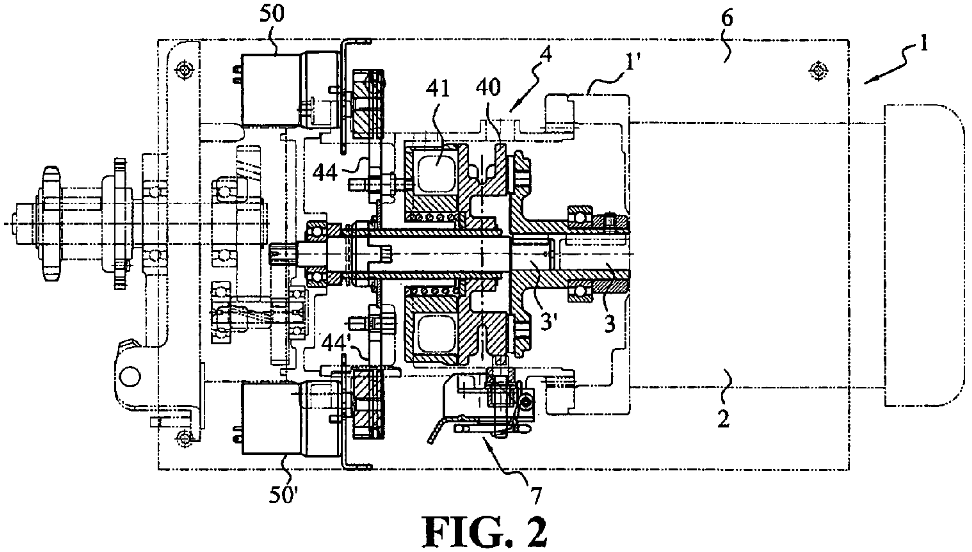
FIG. 2 is a schematic plan view showing the active brake release device attached to the exterior of a door controller according to a second embodiment of the present invention, in which some components are shown in imaginary lines.
Figure 2C:
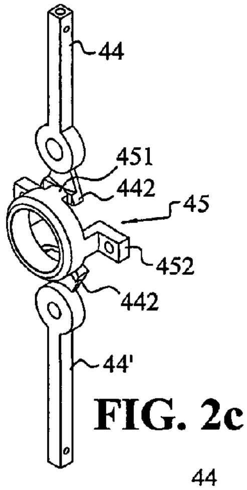
FIG. 2*c* is schematic partial perspective view of the brake-releasing rod of the second embodiment of the present invention in activated state.
Figure 2A:
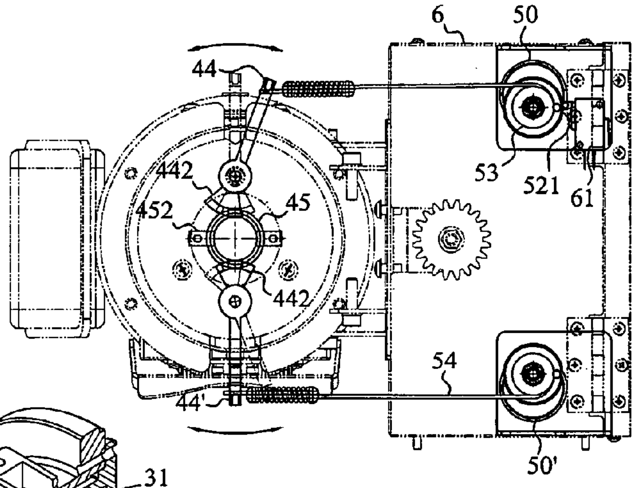
FIG. 2*a* is a view seen from the left side of FIG. 2.
Figure 2B:
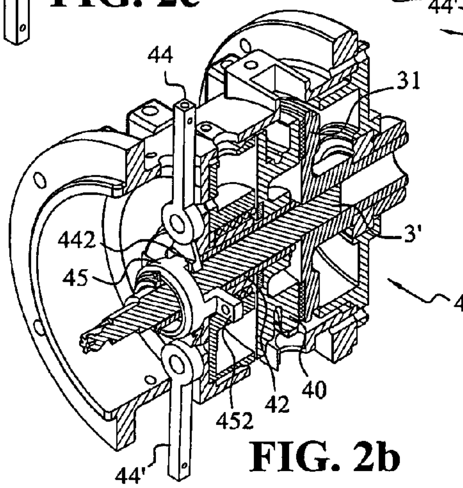
FIG. 2*b* is a sectional perspective view showing the second embodiment of the present invention (in which irrelevant components are omitted thereof).
Figure 2D:
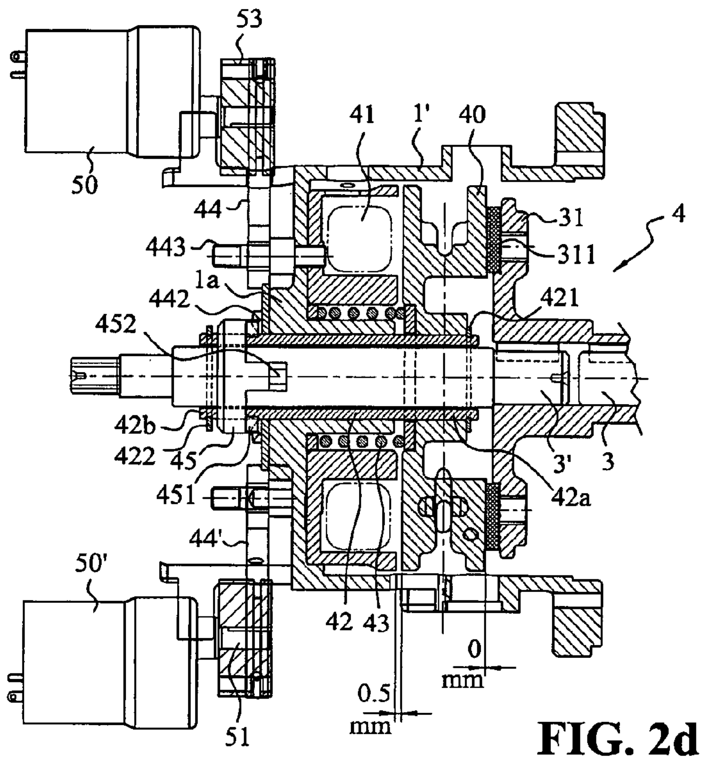
FIG. 2*d* is a schematic sectional view showing the second embodiment of the present invention (in which irrelevant components are omitted thereof) in which the device is in braked state.
Figure 2E:
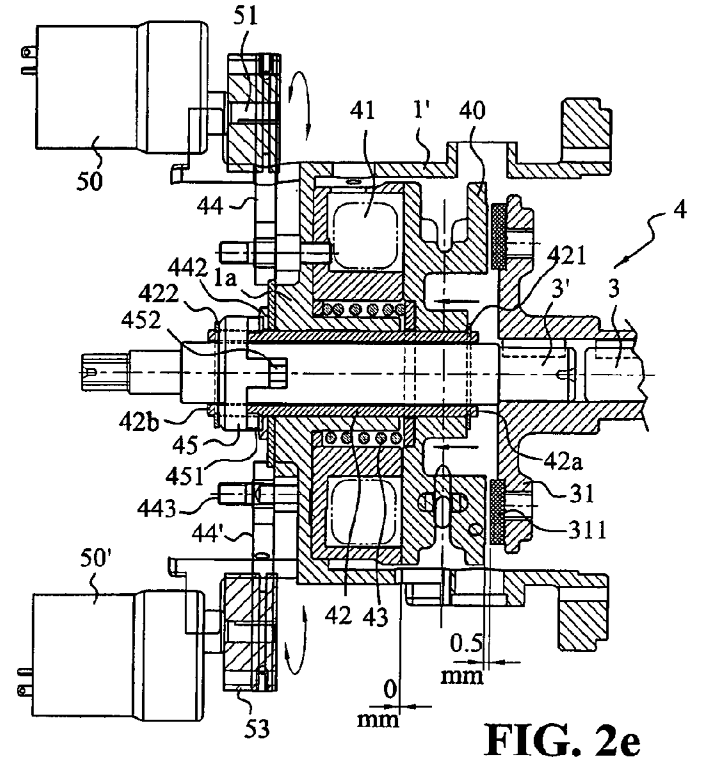
FIG. 2*e* is a schematic sectional view showing the second embodiment of the present invention (in which irrelevant components are omitted thereof) in which the device is in a brake-released state.

FIG. 2~FIG. 2*e* shows an active brake release device according to the second embodiment of the present invention. The configuration of this embodiment is basically the same as that of the first embodiment, repeated description is omitted thereof. The difference of this embodiment from the first embodiment will be described as below:

1). The pair of the brake releasing rods 44, 44' are swingable at the respective middle point which is pivoted at the side wall 1*a* of the housing 1' by a pin 443. The inner end of each brake releasing rod has a cam portion 442 which has a concave part in the direction opposite to the side wall 1*a,* and the outer end extends to the outside of the housing 1';

2). A follower ring 45 is inserted at the outside of the second end 42*b* of the bushing 42 and is slidable between the cam portion 442 and the retainer 422. The follower ring 45 has a pair of follower projecting portions 451 which engage with the concave part of the cam portion 442, and a pair of limiting portions 452 which prevent the follower ring 45 from rotating (as shown in FIGS. 2*b* and 2*c*).

According to the present invention, a pair of second motors 50, 50' are provided in the power distributing cabinet 6, each of which has an eccentric shaft 51. Each eccentric shaft 51 has a winding portion 53 which is connected with one end of the cable 54. The other end of the cable 54 is connected with the outer end of the brake releasing rod 44, 44'. In the case of electricity failure, backup electricity is supplied from a capacitor or a battery in a circuit to activate the second motor 50, 50'. A drag force produced by the rotation of the second motor 50, 50' is applied respectively to the outer end of the brake releasing rod 44, 44' such that the cam portion 442 at the inner end is caused to swing. The swing motion of the cam portion 442 results in the engagement between the follower projecting portions 451 and the concave part of the cam portion 442, which in turn transformed into the following motion of the follower ring 45. In this manner, the bushing 42 is dragged by the follower ring 45 to slide in the axial direction so as to release braking (as shown in FIG. 2*e*). Furthermore, the circuit has a sensor switch 61 provided at the side of the winding portion 53 of the second motor 50, 50'. Correspondingly, the winding portion 53 is formed with a positioning groove 521 which is used to control the eccentric wheel 52 to return to its original position in the case of recovery of electricity (as shown in FIG. 2*d*).

Figure 3:
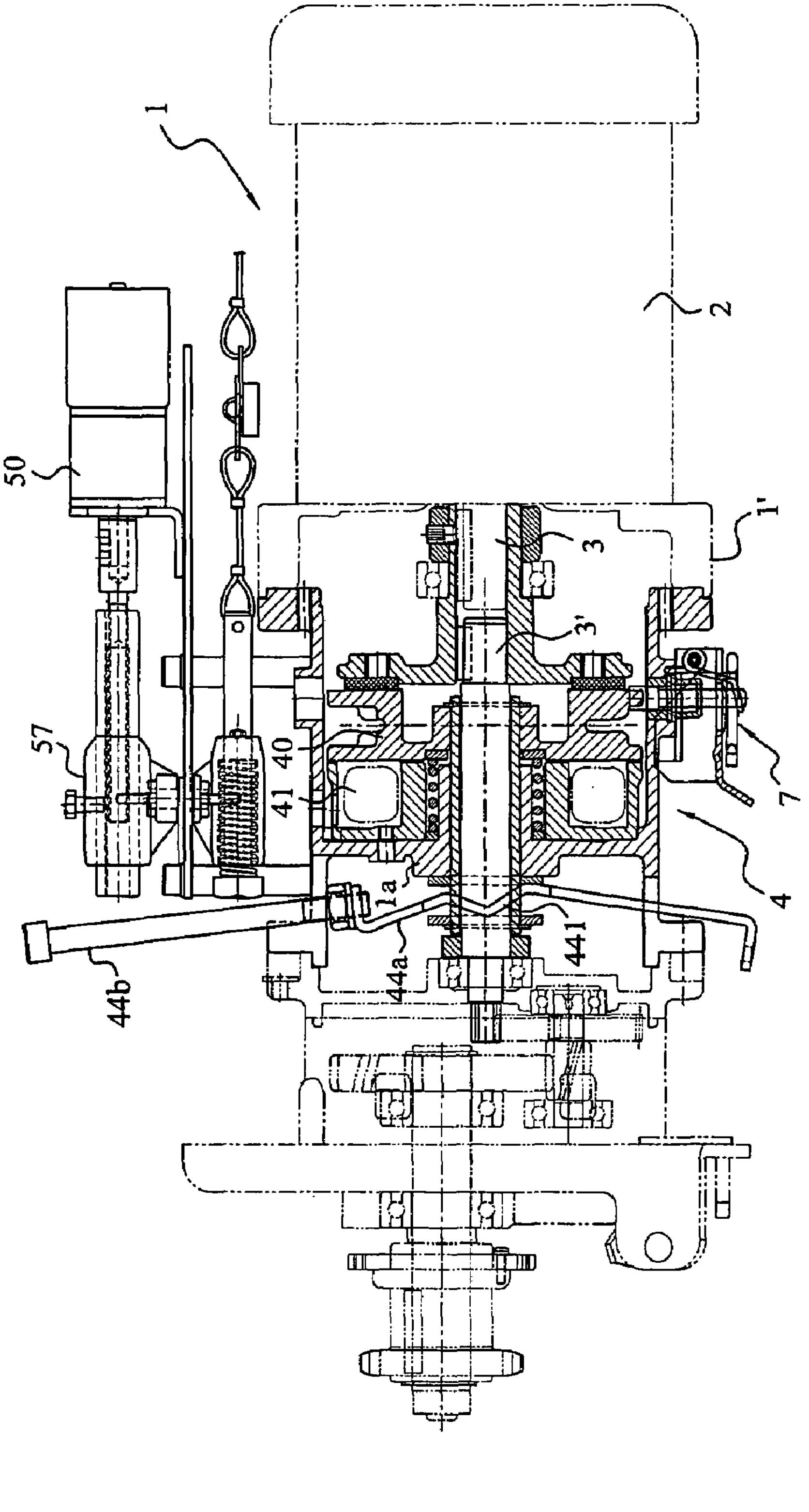
FIG. 3 is a schematic plan view showing the active brake release device attached to the exterior of a door controller according to a third embodiment of the present invention, in which some components are shown in imaginary lines.
Figure 3A:
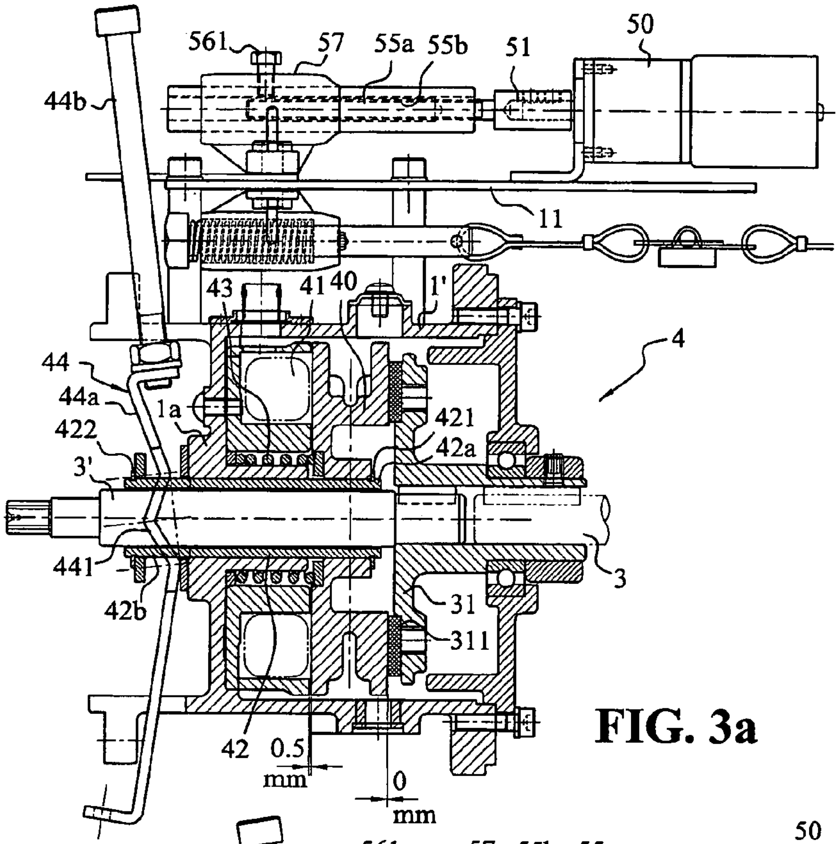
FIG. 3*a* is a schematic sectional view showing the third embodiment of the present invention (in which irrelevant components are omitted thereof) in which the device is in braked state.
Figure 3B:
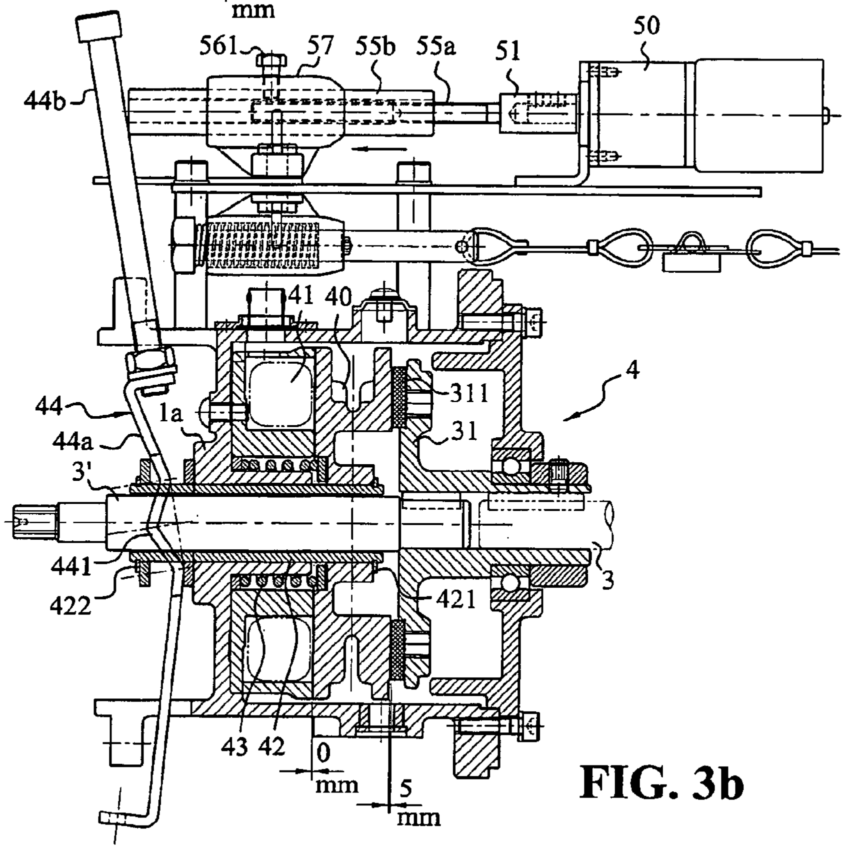
FIG. 3*b* is a schematic sectional view showing the first embodiment of the present invention (in which irrelevant components are omitted thereof) in which the device is in brake-released state.

FIG. 3~FIG. 3*b* shows an active brake release device according to the third embodiment of the present invention. The configuration of this embodiment is basically the same as that of the above embodiments, repeated description is omitted thereof. The difference of this embodiment from the above embodiments will be described as below:

3). The inner end 44*a* of the brake releasing rod 44 has a convex portions 441 between the side wall 1*a* of the housing 1' and the retainer 422 at the second end 42*b* of the bushing 42, while the outer end 44*b* extends to the outside of the housing 1'. A push force in the axial direction applied at the outer end 44*b* of the brake releasing rod 44 will cause a leverage action, with the convex portion 441 as the fulcrum, which will cause the bushing slide in axial direction to release braking.

According to the present invention, a second motor 50 is fixed on a base plate 11 at the outside of the door controller 1 and located at the side of the outer end 44*b* of the brake releasing rod 44. The rotary shaft 51 of the second motor 50 is connected with a male threaded rod 55*a,* which is in mating engagement with a female threaded member 55*b* provided at outside. A guiding portion 57 is fixed on the base plate 11, which has a center bore loosely fitted on the outside of the female threaded member 55*b*. A limiting screw 571 is provided in the guiding portion 57, which is used to prevent the female threaded member 55*b* from rotating, while allowing the female threaded member 55*b* slide in the axial direction to abut the outer end 44*b* of the brake releasing rod 44 (as shown in FIG. 3*a*). In the case of electricity failure, backup electricity is supplied from a capacitor or a battery in a circuit to activate the second motor 50, in turn, the female threaded member 55*b* is caused to extend forwardly by the threaded engagement with the male threaded rod 55*a*. A push force is thus produced by female threaded member 55*b* and applied at the outer end 44*b* of the rod 44, which will cause a leverage action, with the convex portion 441 as the fulcrum, which will force the bushing slide in the axial direction to release braking (as shown in FIG. 3*b*). In addition, a conventional sensor switch, such as micro switch can be used to detect the displacement of the female threaded member 55*b,* so as to return the female threaded member 55*b* to its original position in the case of recovery of electricity.

Figure 4:
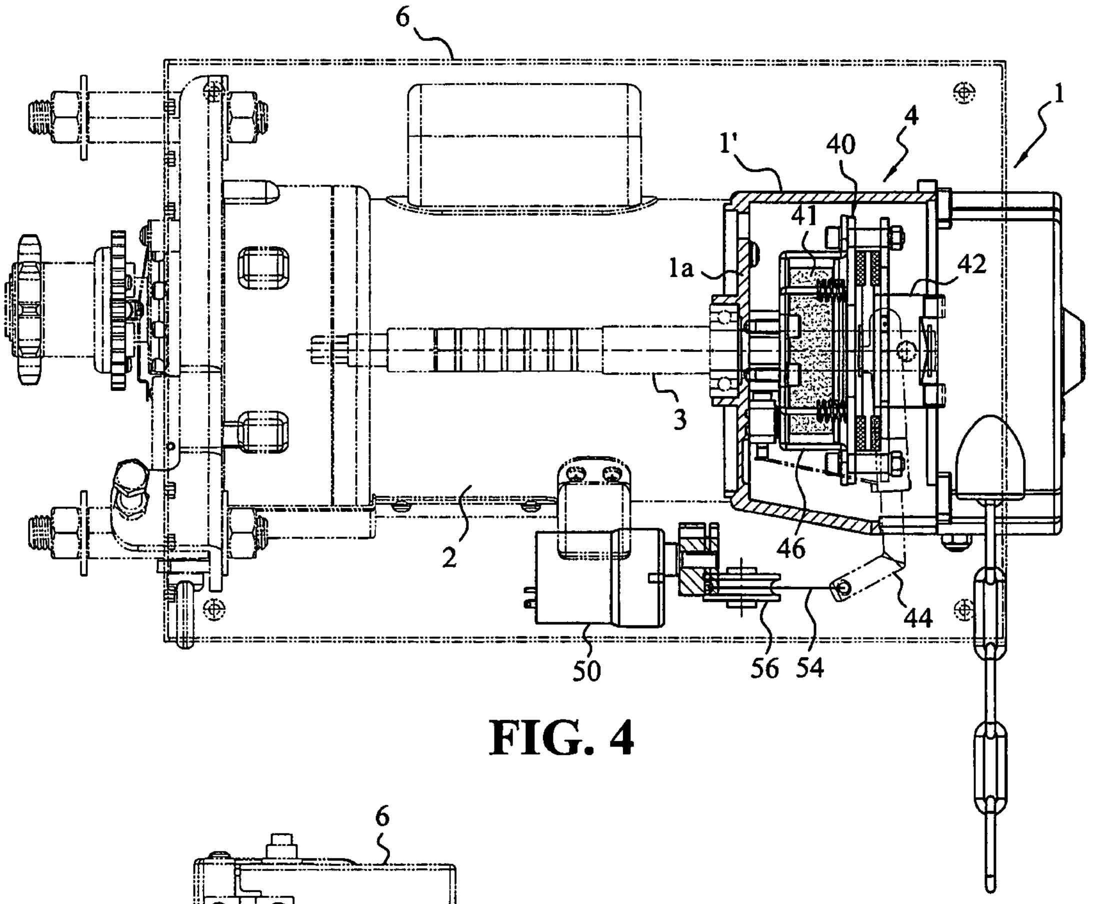
FIG. 4 is a schematic plan view showing the active brake release device attached to the exterior of a door controller according to a fourth embodiment of the present invention, in which some components are shown in imaginary lines.
Figure 4A:
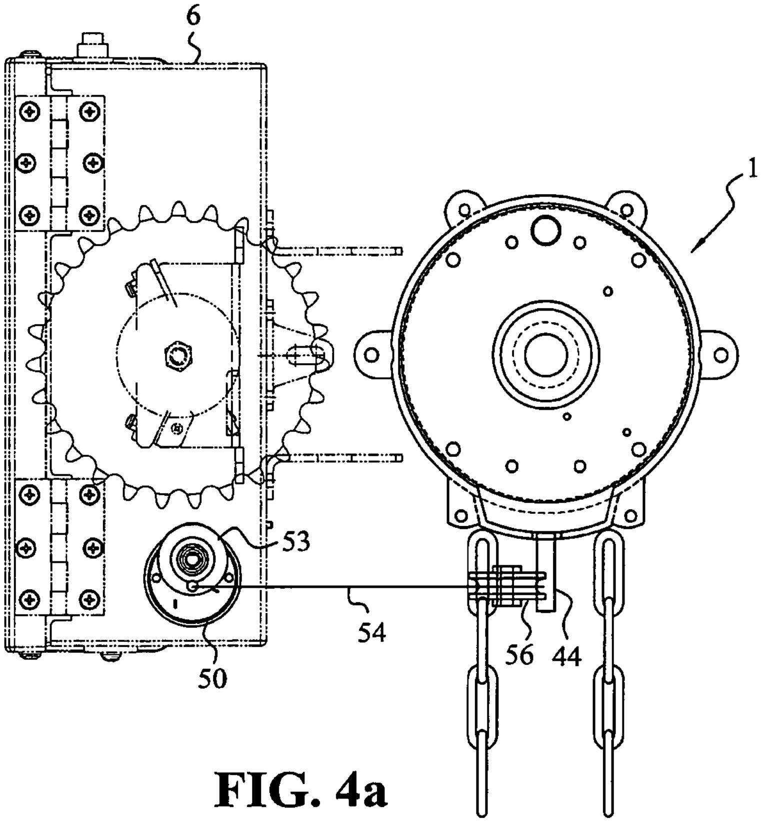
FIG. 4*a* is a view seen from the right side of FIG. 4.
Figure 4D:
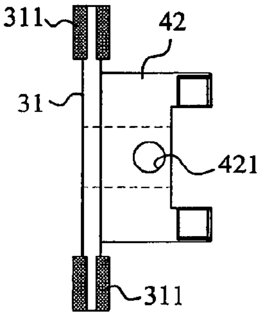
FIG. 4*d* is a schematic view showing the integral structure of the braked disc and the sleeve of the fourth embodiment of the present invention.

FIG. 4~FIG. 4*d* shows an active brake release device according to the fourth embodiment of the present invention. The door controller 1, as in the above embodiments, has a housing 1' for receiving a first motor 2, the driving torque of which is transferred through the rotary shaft 3,3' to a reel for winding the door (not shown). The difference of this embodiment from the above embodiments is that this embodiment uses a two-directional clutch type brake.

According to this embodiment of the present invention, the brake device 4 comprises:

A braked disc 31, integrally formed with a bushing 42 (as shown in FIG. 4*d*), is loosely fitted onto the rotary shaft 3 of the first motor, and retained by a pair of retaining ring 425 on the shaft 3. The braked disc 31 has brake linings 311 provided on both side surfaces. The bushing 42 is formed with a radial through-hole 423. A pin 424 whose diameter is smaller than that of the through hole 423 pierces through the through-hole 423, and the middle portion of the pin 434 is fixed on the shaft 3. In this manner, the bushing 42 is allowed to slide in the axial direction, however is prevented from rotating with respect to the shaft 3. A resilient diaphragm 426 is provided at the end of the shaft 3, which is located between the bushing 42 and the retaining ring 425. The resilient diaphragm 426 is used to store potential energy for the braked disc 31 and the bushing 42.

Figure 4B:
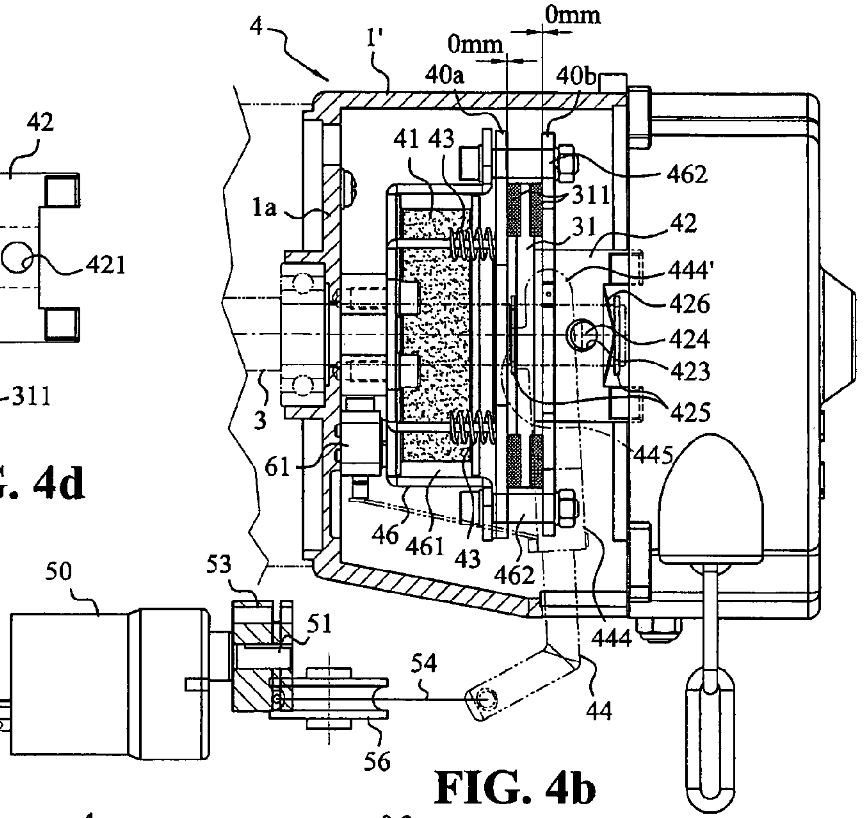
FIG. 4*b* is a schematic sectional view showing the fourth embodiment of the present invention (in which irrelevant components are omitted thereof) in which the device is in braked state.

A support frame 46 has a receiving portion 461 facing the braked disc 31, one end of the support frame 46 is fixed on the side wall 1*a* of the housing 1' of the door controller 1, and the other end has a plurality of guiding pins 462 fixed on it and protruded toward the braked disc 31. An electromagnet 41 is received in the receiving portion 461 and encircling the periphery of the shaft 3. A braking portion 40 having a first braking disc 40*a* and a second braking disc 40*b* encircles the periphery of the shaft 3 and is located at both sides of the braked disc 31. the first braking disc 40*a* is positioned between the electromagnet 41 and the braked disc 31 and is slidable at one side of the guiding pin 462. The second braking disc 40*b* is fixed at the other side of the guiding pin 462. Several spring elements 43 are mounted between the electromagnet 41 and the first braking disc 40*a* for producing bias force which forces the first braking disc 40*a* to abut against the brake lining 311 on one side surface of the braked disc 31, and forces the brake lining 311 on the other side surface of the braked disc 31 to abut against the second braking disc 40*b*. In this manner, a braking state is formed (as shown in FIG. 4*b*). The braking portion 40 normally keeps the braked disc 31 in braked state in the case that the first motor 2 is not energized.

When the first motor 2 is energized, the electromagnet 41 is energized and excited thereby. Thus, the braking portion 40 separates apart from the braked disc 31 and is attracted to the side of the electromagnet 41 such that a brake releasing state is formed.

A brake releasing rods 44 is formed with a U-shape portion 444 at its inner end. The U-shape portion 444 encircles the outside of the braked disc 31. Both ends 444' of the U-shape portion 444 is pivoted at both sides of the second braking disc **40*b* to swing, the bottom end of the U extends to the outside of the housing 1' of the door controller. A projecting portion 445 is formed beneath each end 444' of the U-shape portion 444, which abuts against the first braking disc 40*a***.

A second motors 50 provided within a power distributing cabinet 6 has an eccentric shaft 51 and a winding portion 53. A cable 54 is provided with one end connected to the winding portion 53, and the other end connected to the outer end of the brake releasing rod 44 through a plurality of deflecting wheels 5.

Figure 4C:
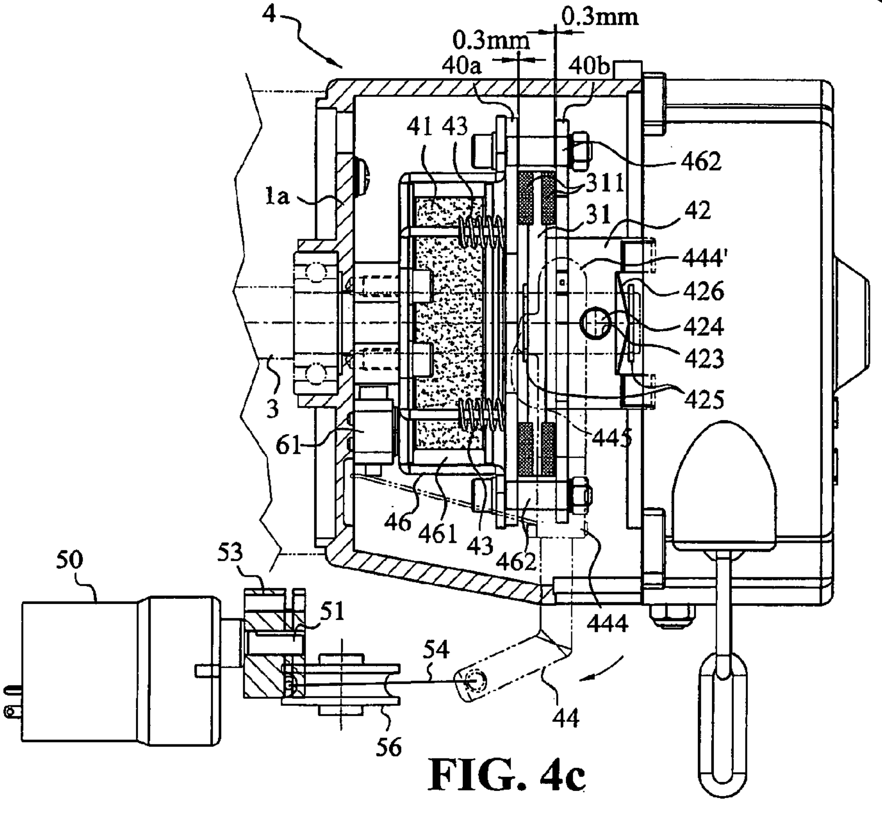
FIG. 4*c* is a schematic sectional view showing the fourth embodiment of the present invention (in which irrelevant components are omitted thereof) in which the device is in brake-released state.

The device of the present invention includes a circuit. The circuit includes a capacitor or a battery for storing backup power which is used to temporarily supply electricity to the second motor 50 in case of electricity failure condition to wind the cable 54. A drag force produced by the winding action is thus applied to the outer end of the brake releasing rods 44. The leverage action caused by U-shape portion 444 pushes the first braking disc **40*a* separating apart from the second braking disc 40*b* so as to release braking (as shown in FIG. 4*c*). In addition, a sensor switch 61 is used in the present invention to detect the displacement of the U-shape portion 444, so as to return the U-shape portion 444** to its original position in the case of recovery of electricity.

Symbol List of Main Components

1 Door controller
1' housing
**1*a*** side wall
11 Base plate
2 first motor
3,3' shaft
31 braked disc
311 brake lining
4 brake device
40 braking portion
**40*a*** first braking disc
**40*b*** second braking disc
41 electromagnet
42 bushing
**42*a*** first end
**42*b*** second end
421,422 retainer
423 through-hole
424 pin
425 retaining ring
426 resilient diaphragm
43 spring element
44,44' brake releasing rod
**44*a*** inner end
**44*b*** outer end
441 convex portion
442 cam portion
442 pin
444 U shape portion
444' both ends of U shape portion
445 projecting portion
45 follower ring
451 follower projecting portion
452 limiting portion
46 support frame
461 receiving portion
462 guiding pin
50,50' second motor
51 shaft
52 eccentric wheel
521 positioning groove
53 winding portion
54 cable
**55*a*** male threaded rod
**55*b*** female threaded rod
56 deflecting wheel
57 guiding portion
571 limiting screw
6 power distributing cabinet
61 sensor switch
7 holding portion

I claim:

1. An active break release device driven by a second motor and externally attached to the door controller, which is used for the triggering of automatic brake releasing to close the safety door in unexpected electricity failure condition, in which said door controller (1) have a housing (1') for receiving a first motor (2), the driving torque of which is transferred through a rotary shaft (3, 3') to a reel for winding the door;

a braking device (4) is provided at the outside of said rotary shaft (3, 3'), which includes a braking portion (40) normally located at a brake activating position, and located at a brake releasing position when the first, motor (2) is energized, wherein said active break release device comprises:

at least a brake releasing rod (44, 44'), one end of which activates the braking portion (40) to release brake by leverage action force, while the other end of which extending to the outside of the door controller (1);

at least a second motor (50, 50') provided externally at the door controller (1), the driving torque of which is applied to the other end of the brake releasing rod (44, 44') and cause to move thereof, the second motor being temporarily supplied with electricity through a circuit having a backup power source in the case of unexpected electricity failure condition, and the braking portion (40) being driven by said second motor (50, 50') to release the braking.

2. An active brake release device attached to the exterior of a door controller as claimed in claim 1, wherein said brake device (4) comprises:

a braked disc (31), the center of which is inserted and fixed on said shaft (3,3') of the first motor (2) to rotate together therewith, which has a radial surface for mounting a brake lining (311);

a bushing (42), having a first end (**42*a*) and a second end (42*b*), which is loosely fitted at the outside of said rotary shaft (3') for sliding in axial direction thereof, a retainer (422) being provided at the outside of said second end (42*b*) of the bushing (42**);

an electromagnet (41), which is fixed on said side wall (**1*a*) of the housing (1') of the door controller (1) and encircling around the outside of said bushing (42**);

a braking portion (40), the center of which is inserted and fixed on said first end (**42*a*) of the bushing (42) by a retainer (421), and the braking portion (40) being located between said braked disc (31) and said electromagnet (41**);

a spring element (43), which is received between said bushing (42) and said electromagnet (41) for producing a bias force for the braking portion (40) to abut against the brake lining (311) of the braked disc (31).

3. An active brake release device attached to the exterior of a door controller as claimed in claim 2, wherein said brake releasing rod (44, 44') is formed, at each inner end, with a convex portion (441) located between said side wall (1*a*) of the housing (1') and said retainer (422) at said second end (42*b*) of the bushing (42), and the outer end of each brake releasing rods (44, 44') extending to the outside of the housing 1', a pull force applied at the outer end of said brake releasing rods (44, 44') causing a leverage action, with said convex portion (441) as the fulcrum, which will cause the bushing (42) slide in axial direction to release braking.

4. An active brake release device attached to the exterior of a door controller as claimed in claim 3, wherein said second motors (50, 50') are provided in a power distributing cabinet (6), each shaft (51) of said second motors (50, 50') having a winding portion (53) connected with one end of a cable (54), and the other end of said cable (54) being connected to the outer end of said brake releasing rod (44, 44') through a plurality of deflecting wheels (56).

5. An active brake release device attached to the exterior of a door controller as claimed in claim 4, wherein said winding portion (53) is provided on a eccentric wheel (52) fixed on said shaft (51).

6. An active brake release device attached to the exterior of a door controller as claimed in claim 5, wherein said braking portion (40) is a manually chain-operated disc operated by pulling a chain, and the chain in the normal mode of electrically operated condition being held by a holding section (7) provided at the outside of said housing (1') so that the manually chain-operated disc is kept inoperable.

7. An active brake release device attached to the exterior of a door controller as claimed in claim 6, wherein said backup power source is a capacitor or a battery provided in said circuit.

8. An active brake release device attached to the exterior of a door controller as claimed in claim 2, wherein said brake releasing rods (44, 44') are swingable at the respective middle point which is pivoted at the side wall (1*a*) of the housing (1') through a pin (443), the inner end of each brake releasing rod (44, 44') having a cam portion (442) which has a concave part in the direction opposite to said side wall (1*a*), and the outer end extending to the outside of the housing (1');

a follower ring (45) being inserted at the outside of the second end (42*b*) of the bushing (42) and being slidable between the cam portion (442) and the retainer (422), said follower ring (45) having a pair of follower projecting portions (451) engaged with said concave part of the cam portion (442), and a pair of limiting portions (452) being provided to prevent the follower ring 45 from rotating, a drag force produced by the rotation of said second motors (50, 50') being applied respectively to the outer end of the brake releasing rod (44, 44') such that the cam portion (442) at the inner end is caused to swing, in turn, said follower ring (45) being moved by the swinging of said cam portion (442) such that said bush (42) is caused to slide in the axial direction.

9. An active brake release device attached to the exterior of a door controller as claimed in claim 8, wherein said second motors (50, 50') are provided in a power distributing cabinet (6), each second motors (50, 50') having an eccentric shaft (51) which includes a winding portion (53) connected with one end of a cable (54), and the other end of said cable (54) being connected to said outer end of said brake releasing rod (44, 44').

10. An active brake release device attached to the exterior of a door controller as claimed in claim 9, wherein said braking portion (40) is a manually chain-operated disc operated by pulling a chain, and the chain in the normal mode of electrically operated condition being held by a holding section (7) provided at the outside of said housing (1') so that the manually chain-operated disc is kept inoperable.

11. An active brake release device attached to the exterior of a door controller as claimed in claim 10, wherein said backup power source is a capacitor or a battery provided in said circuit.

12. An active brake release device attached to the exterior of a door controller as claimed in claim 2, wherein said brake releasing rod (44, 44') is formed, at each inner end (44*a*), with a convex portion (441) located between said side wall (1*a*) of the housing (1') and said retainer (422) at said second end (42*b*) of the bushing (42), and the outer end (44*b*) of each brake releasing rods (44, 44') extending to the outside of the housing (1'), a push force applied at the outer end (44*b*) of said brake releasing rod (44, 44') causing a leverage action, with said convex portion (441) as the fulcrum, which will cause the bushing (42) slide in the axial direction to release braking.

13. An active brake release device attached to the exterior of a door controller as claimed in claim 12, wherein said second motor (50) is fixed at the exterior of the door controller (1), the shaft (3) of which having a male threaded rod (53*a*) in mating engagement with a female threaded member (53*b*) which can move forward and backward in response to the rotation of said male threaded rod (53*a*), and which is located at side of the outer end (44*b*) of the brake releasing rod (44).

14. An active brake release device attached to the exterior of a door controller as claimed in claim 13, wherein said braking portion (40) is a manually chain-operated disc operated by pulling a chain, and the chain in the normal mode of electrically operated condition being held by a holding section (7) provided at the outside of said housing (1') so that the manually chain-operated disc is kept inoperable.

15. An active brake release device attached to the exterior of a door controller as claimed in claim 14, wherein said backup power source is a capacitor or a battery provided in said circuit.

16. An active brake release device attached to the exterior of a door controller as claimed in claim 1, wherein said brake device (4) comprises:

a braked disc (31), integrally formed with a bushing (42), being loosely fitted onto said rotary shaft (3) of the first motor (2), and retained by a pair of retaining ring (425) on said shaft (3), said braked disc (31) having brake linings (311) provided on both side surfaces of it, and said bushing (42) being formed with a radial through-hole (423);

a pin (424), whose diameter is smaller than that of the through-hole (423) piercing through said through-hole (423), and the middle portion of said pin (434) being fixed on said shaft (3);

a support frame (46), having a receiving portion (461) facing the braked disc (31), one end of which being fixed on the side wall (1*a*) of the housing (1') of the door controller (1), and the other end having a plurality of guiding pins (462);

an electromagnet (41), which is received in said receiving portion (461) and encircles the periphery of said shaft (3);

a braking portion (40), having a first braking disc (40*a*) and a second braking disc (40*b*), which encircles the periphery of said shaft (3 ) and is located at both sides of said braked disc (31), said first braking disc (40*a*) being positioned between said electromagnet (41) and said braked disc (31) and being slidable at one side of said guiding pin (462), said second braking disc (40*b*) being fixed at the other side of said guiding pin (462);

several spring elements (43), which are mounted between said electromagnet (41) and said first braking disc (40*a*) for producing a bias force which forces said first braking disc (40*a*) and said second braking disc (40*b*) to abut against said brake lining (311) of the braked disc (31).

17. An active brake release device attached to the exterior of a door controller as claimed in claim 16, wherein a pair of retaining ring (425) are used to retain said braked disc (31) and said bushing (42) on the shaft (3), and a resilient diaphragm (426) being provided between said bushing (42) and said retaining ring (425), which is used to store the potential energy for said braked disc (31) and said bushing (42).

18. An active brake release device attached to the exterior of a door controller as claimed in claim 17, wherein said brake releasing rod (44) is formed with a U-shape portion (444) at its inner end, which encircles the outside of said braked disc (31), both ends (444') of said U-shape portion (444) being pivoted at both sides of the second braking disc (40*b*) to swing, a projecting portion (445) being formed beneath each end (444') of said U-shape portion (444), which can abut against the first braking disc (40*a*).

19. An active brake release device attached to the exterior of a door controller as claimed in claim 18, wherein said second motors (50, 50') are provided in a power distributing cabinet (6), each shaft (51) of said second motors (50, 50') having a winding portion (53) connected with one end of a cable (54), and the other end of said cable (54) being connected to the outer end of said brake releasing rod (44, 44') through a plurality of deflecting wheels (56).

20. An active brake release device attached to the exterior of a door controller as claimed in claim 19, wherein said backup power source is a capacitor or a battery provided in said circuit.

* * * * *